US012008523B2

(12) United States Patent
Ryann et al.

(10) Patent No.: US 12,008,523 B2
(45) Date of Patent: Jun. 11, 2024

(54) SINGLE-USE MULTI-LAYERED TICKET AND REDEEMING TECHNIQUE

(71) Applicant: BITNOTE, INC., San Antonio, TX (US)

(72) Inventors: William F. Ryann, San Antonio, TX (US); Fausto Uribe, San Antonio, TX (US)

( * ) Notice: Subject to any disclaimer, the term of this patent is extended or adjusted under 35 U.S.C. 154(b) by 591 days.

(21) Appl. No.: 15/749,302

(22) PCT Filed: Jul. 23, 2016

(86) PCT No.: PCT/US2016/043774
§ 371 (c)(1),
(2) Date: Jan. 31, 2018

(87) PCT Pub. No.: WO2017/023588
PCT Pub. Date: Feb. 9, 2017

(65) Prior Publication Data
US 2018/0225638 A1    Aug. 9, 2018

Related U.S. Application Data

(60) Provisional application No. 62/199,988, filed on Aug. 1, 2015.

(51) Int. Cl.
*G06Q 20/04* (2012.01)
*G06Q 20/06* (2012.01)
(Continued)

(52) U.S. Cl.
CPC ........... *G06Q 20/045* (2013.01); *G06Q 20/06* (2013.01); *G06Q 20/3276* (2013.01);
(Continued)

(58) Field of Classification Search
CPC .. G06Q 20/045; G06Q 20/06; G06Q 20/3276; G06Q 20/348; G06Q 20/3829; G07F 17/42; G09C 5/00; H04L 9/3247
See application file for complete search history.

(56) References Cited

U.S. PATENT DOCUMENTS 5,265,008 A * 11/1993 Benton ................. G06Q 20/04
235/379
2007/0108270 A1 * 5/2007 Bjoraker ............... G06Q 20/20
705/17

(Continued)

FOREIGN PATENT DOCUMENTS

WO    WO-9924130 A1 * 5/1999 .......... A63F 3/0665

OTHER PUBLICATIONS

Personalized Cash/Gift Cards, Sep. 13, 2007, IP.com Prior Art Database, pp. 1-7 (Year: 2007).*

*Primary Examiner* — Nilesh B Khatri

(57) ABSTRACT

A ticket for managing cryptocurrency. The ticket incorporates a redeeming code in combination with a loading code for activating the redeeming code. At the same time, however, the loading code also prohibits access to the underlying redeeming code, thereby preventing use. Therefore, in order to access the redeeming code and redeem the ticket of cryptocurrency, the loading code is inherently destroyed by removal. Thus, the ticket is no longer practically able to be re-loaded and is thus, single-use, thereby aiding in user understanding and management of cryptocurrency.

9 Claims, 6 Drawing Sheets

(51) Int. Cl.
  *G06Q 20/32* (2012.01)
  *G06Q 20/34* (2012.01)
  *G06Q 20/38* (2012.01)
  *G07F 17/42* (2006.01)
  *G09C 5/00* (2006.01)
  *H04L 9/32* (2006.01)

(52) U.S. Cl.
  CPC ....... *G06Q 20/348* (2013.01); *G06Q 20/3829* (2013.01); *G07F 17/42* (2013.01); *G09C 5/00* (2013.01); *H04L 9/3247* (2013.01)

(56) References Cited

U.S. PATENT DOCUMENTS

| | | | | |
|---|---|---|---|---|
| 2009/0277968 | A1* | 11/2009 | Walker | G07F 7/08 |
| | | | | 235/487 |
| 2013/0166455 | A1* | 6/2013 | Feigelson | H04L 9/3234 |
| | | | | 705/64 |
| 2013/0204781 | A1* | 8/2013 | Flitcroft | G06Q 20/40 |
| | | | | 705/41 |
| 2014/0122327 | A1* | 5/2014 | Aleles | G06Q 20/381 |
| | | | | 705/39 |
| 2014/0257956 | A1* | 9/2014 | Durbha | G06Q 30/0225 |
| | | | | 705/14.23 |
| 2014/0319223 | A1* | 10/2014 | Boge | G06K 19/07309 |
| | | | | 235/488 |

* cited by examiner

SINGLE-USE MULTI-LAYERED TICKET AND REDEEMING TECHNIQUE

BACKGROUND

As a matter of user convenience, electronically transferring value to further transactions has been emerging for decades, largely overtaking harder currency funded exchanges such as the transfer of cash or a check from a purchaser to a retail seller. Indeed, even many check funded transactions now take place in a partially electronic, real-time manner with the check accepted by the retailor being wirelessly posted to the purchaser's account at the very time of the transaction.

Of course, as opposed to merely being partially electronic, as in the real-time posting of a check, it is even more common for a purchaser to utilize debit or credit cards to fund the transaction. These transactions are funded without the exchange of any instrument between the purchaser and the seller. Instead, the transaction remains entirely electronic with the purchaser effectively transferring value to the seller without the transfer of any physical instruments. Instead, a magnetic strip of the card is automatically read at the point of purchase in order to fund the transaction. This affords a level of real-time added convenience for the transaction. For example, the purchaser need not keep track of or fill out physical instruments in order to complete the transaction. Once more, the completion of the transaction automatically updates the seller and purchaser accounts.

Similar to credit and debit "card" transactions, internet and mobile device transactions often take place without the use of a physical card at all. That is, as opposed to physically using a magnetic strip of a handheld card, card-type account information may be supplied in other ways. In the case of an internet purchase, the account information may be manually supplied at a user interface and managed by a server in order to complete a debit or credit transaction. As a matter of even more convenience, an "app" on a smartphone may be utilized to automatically supply such information at the point of sale via near field communication. In this circumstance, the card is replaced by a mobile device that the user is already likely to be carrying on person. Thus, not only is the use of a more cumbersome card avoided, but so is the need to manually supply the account information as in the noted internet transaction.

Unfortunately, unlike the transfer of a purely liquid asset such as gold, the above modes of transferring value from one user to another that utilize an alternative instrument or electronic transfer require management or backing by a centralized institution. This is particularly true for the purely electronic transactions. That is, unlike cash, which even though backed by a government body may become near liquid in exchangeability, electronic transfers generally take place between financial institutions. Thus, for a purchaser, a seller or anyone seeking to transfer electronic value, a host of fees for managing the account and each transfer are generally involved. This often has a disproportionate impact on the smaller dollar account holders. Indeed, rather than pay a host of different account and transaction fees, someone with under $1,000 in total funds is generally more likely to keep these funds in tangible cash and avoid such fees as compared to someone with over $10,000 in total funds.

However, recent developments in crypto-currencies such as Bitcoin allow anyone, including smaller funded individuals, to deal in electronic currency without facing the transactional fees and other costs often associated with electronic currency exchanges. This is due to the fact that crypto-currency is decentralized, without any need for an intermediate party to regulate the transaction. No governmental or banking body is required in order to issue, guarantee or regulate the electronic instrument for the transaction. Rather, once the Bitcoin, is acquired by the user, it may be directly electronically exchanged "peer to peer" with another user. Thus, Bitcoin is able to serve as an electronic cash system that does not disproportionately impact the user who has a generally smaller available amount of funds.

Unfortunately, there is a real difficulty for the non-technical user to be able to be part of a crypto-currency system. That is, even though more and more smaller funded users have access to computers and smartphones than ever before, it remains quite common that they do not have the skill required to operate in the crypto-currencies realm. Indeed, this often remains a challenge for more well-funded users as well. Presently, operating with crypto-currencies requires the understanding of abstract concepts such as asymmetric cryptography, as well as the protocols used to acquire, store and transmit value securely using this digital intangible system. The end result is that users who might greatly benefit continue to opt for cash modes or electronic fee modes.

Efforts have been undertaken to simplify cryptocurrencies by introducing a tangible medium. For example, it is possible to download cryptocurrency from traditional storage locations such as a computer to a card or coin-shaped device with electronic storage capacity. This provides the user with a familiar cash-like handheld instrument for managing the cryptocurrency.

Unfortunately, unlike cash, the electronic instrument does not leave the user when it is spent. This introduces a unique set of challenges for cryptocurrency. Specifically, it may not be immediately apparent if the tangible cryptocurrency instrument is loaded with any value or to what extent. Indeed, given its electronic nature, the loaded value of the instrument is likely to fluctuate as a user adds, spends and then re-loads the instrument. Thus, while on one hand things have become familiar and simplified, on the other hand, the instrument has just introduced a brand new complexity. Ultimately, lacking a more effective simplification tool, the smaller funded, less technical users that might benefit the most from cryptocurrency use remain unlikely to participate in the cryptocurrency realm.

SUMMARY

A multi-layered single-use ticket is provided. The ticket may include a handheld substrate with a redeeming material layer printed at a surface location thereon. The printed redeeming material layer may include at least one redeeming code for accessing and using by the user. Further, the ticket includes a printed loading material layer masking the redeeming code to simultaneously prohibit the accessing and enable the using. At the same time, the loading material layer is removable to simultaneously enable the using and substantially disable subsequent using of the redeeming code by way of loading code activation.

DETAILED DESCRIPTION

In the following description, numerous details are set forth to provide an understanding of the present disclosure. However, it will be understood by those skilled in the art that the embodiments described may be practiced without these particular details. Further, numerous variations or modifications may be employed which remain contemplated by the embodiments as specifically described.

Embodiments are described with reference to certain types of cryptocurrency tickets for recording storage and redeeming of cryptocurrencies. More specifically, embodiments of tickets, applications and techniques are detailed for management and transfer of cryptocurrency. However, a host of other non-cryptocurrency information coding, storage and transfers may benefit from the tickets, applications and techniques detailed herein. For example, rights related to access, title transfers, wills or probate, various assets and other non-currency instruments may incorporate embodiment features and techniques taught herein. Regardless, so long as a loading code is provided over a redeeming code so as to simultaneously enable the use of the loading code while prohibiting user access thereto and at the same time being removable to enable a one-time only use of the redeeming code, appreciable benefit may be realized.

For embodiments detailed below, this is illustrated with a removable "scratch-off" form of loading code or loading material layer. However, a removable sticker, temporary paper covering or other form of material may be utilized. In such embodiments, it may be beneficial to have such coverings be self-destructive upon removal, for example, in the form of single-use scored stickers.

Figure 1:
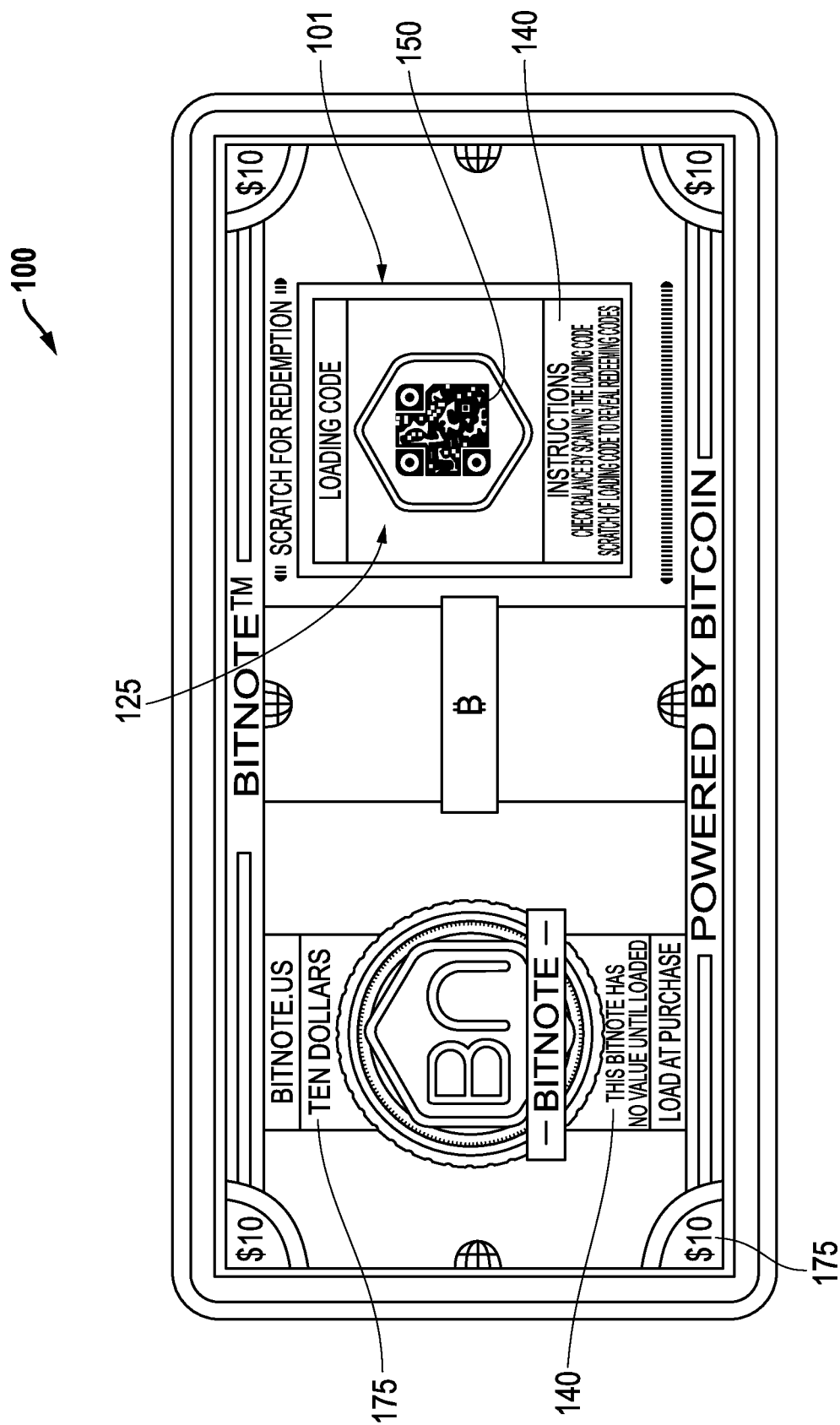
FIG. 1 is a front view of an embodiment of a multi-layered single-use cryptocurrency ticket.

Referring now to FIG. 1, a front view of an embodiment of a multi-layered single-use ticket 100 is shown. In the embodiment shown, the ticket 100 is a cryptocurrency ticket directed at aiding in the management of cryptocurrency by one or more users. However, as alluded to above and detailed further below, embodiments of such a ticket 100 may be useful as an aid in managing or tracking a host of different types of information, whether monetary in nature or otherwise. Additionally, while referred to as a "ticket" 100, this may include a cryptocurrency instrument that generally ranges from a smaller note size of between about 2-3½ inches by 4-6¼ inches. This may correspond to a conventional US or Canadian bill or perhaps a "golden ratio" of about 1.618, adding to tangible familiarity for a user. Of course, depending on the application, larger standard letter, legal or A4 document sizes may be utilized for the ticket 100. Similarly, depending on a host of different factors, the ticket 100 may primarily constitute a lightweight paper document, heavier cardstock-type document or be of primarily hard polymer construction similar to a conventional debit or credit card.

Figure 2A:
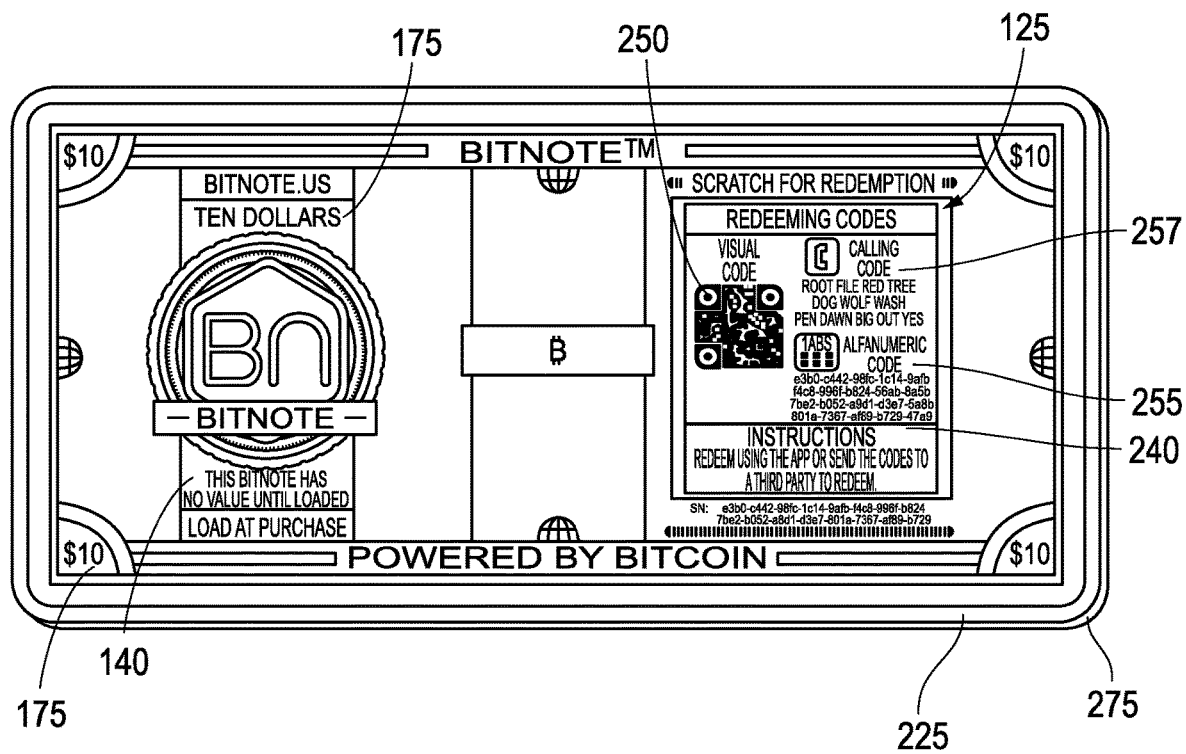
FIG. 2A is a front perspective view of the ticket of FIG. 1 revealing an underlying redeeming material layer thereof.
Figure 2B:
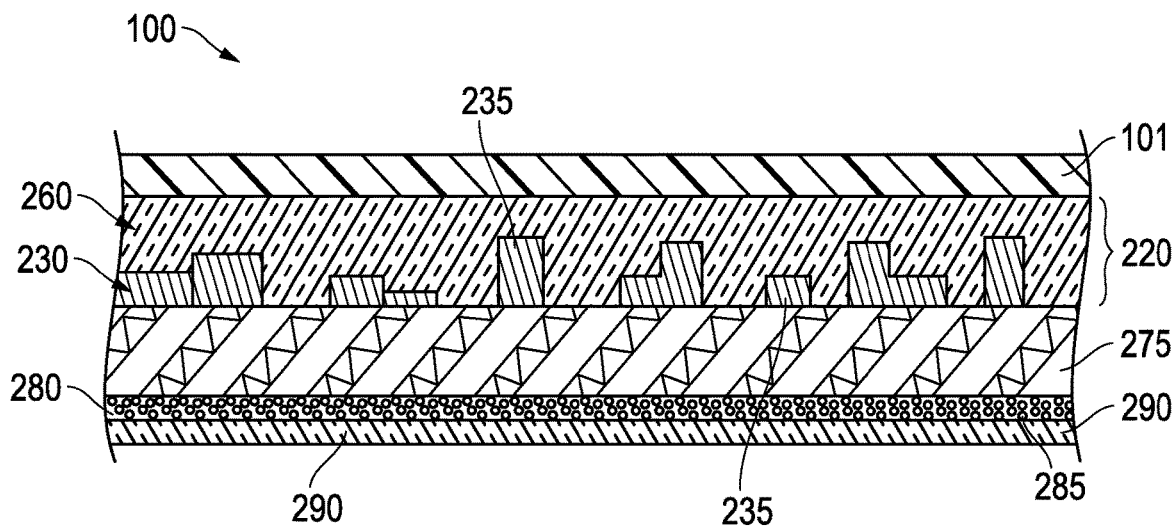
FIG. 2B is a side cross-sectional view of the ticket of FIG. 1 simultaneously revealing a masking loading material layer over the redeeming material layer.

With added reference to FIGS. 2A and 2B, in terms of what the ticket 100 primarily constitutes as noted above, it is an article manufactured of different layers. Specifically, the ticket 100 includes a substrate 275 which may be the largest layer, if not the majority of the overall ticket's thickness. Other compositional layers for at least a portion of the ticket 100 may include a printed redeeming material layer 220 on the substrate 275 and a printed loading material layer 101 masking over the underlying redeeming material layer 220. Marking layers 280, 290 may also be utilized as detailed below as well as others. Overall, the different layers, particularly the material 101, 220 and marking 280, 290 layers may be manipulated by a user in conjunction with each other in a machine like fashion. Specifically, the ticket 100 may be considered an article or even a single-use machine that supports unique methods of information tracking or accounting. Along these lines, exemplary embodiments herein are directed at using the ticket 100 as an aid for cryptocurrency information tracking and accounting, though other types of information may be managed with such a ticket 100 as indicated above.

Continuing with reference to FIG. 1, the ticket 100 is shown in an embodiment for cryptocurrency management as noted. Thus, a variety of different instructions 140 and notations such as the purchase price 175 or cryptocurrency value of the ticket 100 may be shown at various locations. Other design features may be incorporated into the ticket 100 to promote association with funds management. For example, in the US a portrait of a "founding father", Harriet Tubman, or another historical figure may be included whereas in other locations, the ticket 100 may display another person of historical interest. Perhaps even ad space 350 may be provided (e.g. at the backside 325 of the ticket 100 (see FIG. 3B)).

As indicated above and shown at FIG. 1, a loading material layer 101 is provided that incorporates an image of a loading code 150. In the embodiment shown, this code is a QR ("quick response") code. However, a bar code or other electronically, generally machine readable identifier may be utilized. Regardless, in an embodiment where the ticket 100 is to serve as an aid in tracking, transferring or otherwise managing cryptocurrency such as Bitcoin, this code 150 may serve as an identifier which provides a link to a public key corresponding to a public Bitcoin ledger. While this code 150 is public, it is generated simultaneous with one or more private redeeming codes 250, 255, 257 (see FIG. 2A). These codes 250, 255, 257 are not only non-public but they are masked by the material of the loading material layer 101 as detailed further below. For cryptocurrency uses, these codes 250, 255, 257 are privately activated for use by loading of the loading code 150 as described herein for a specific non-public amount.

When utilized for the management of cryptocurrency, the ticket 100 is initially of no given value. Rather, it is no more than an instrument having one visible code 150 covering over a related underlying code 250 (or 255 or 257) (see FIG. 2A). However, none of these codes 150, 250, 255, 257 are initially of any value or usefulness in and of themselves. In fact, even when utilized for "loading" or "redeeming", the ticket 100 itself does not literally loaded with, or redeemed of, Bitcoin, for example. Instead, the ticket 100 may be considered a single-use, machine-like management tool for authorizing the acquisition and/or transfer of Bitcoin as recorded at an electronic ledger. However, due to the ability of the ticket 100 to serve as this type of authorization aid, it may be considered to be of value once "loaded" as noted.

With brief added reference to FIG. 2A, as indicated above, the loading code 150 serves as a removable covering over a redeeming code 250 as also discussed further below. However, in other embodiments, the loading code 150 may be supported by being printed or otherwise provided at the same time as the redeeming code 250 as described above. For example, this may enhance manufacturability due to the informational relationship between the codes 150, 250 as also described further below. Nevertheless, in such embodiments, another covering material is still provided as a mask over the underlying redeeming code 250. In this way, removal of the covering portion may also serve as an indicator to potential users of prior access to the redeeming code information. That is, in either circumstance, the user may be made aware of the likely spent nature of the ticket 100. Thus, with the covering removal as an indicator, the ticket 100 is effectively single-use as a practical matter from the perspective of potential users.

Continuing with reference to FIG. 1, loading, activating or rendering the ticket 100 "live" may be achieved in a variety of manners. For example, in one embodiment, in addition to other information encoded within the loading code 150, personalized information corresponding to an authorized electronic reader of an authorized seller or distributor may be found. Thus, a retailer having authority to "load" the ticket with a particular amount of cryptocurrency may utilize a personal application and/or code reader to activate the ticket 100. So, for example, a particular amount of Bitcoin may be loaded onto the ticket 100 by the authorized seller/retailer as reflected by recording at the public ledger. Indeed, the application utilized by the retailer may both acquire Bitcoin for the retailer and load the Bitcoin to the ticket 100 in a near simultaneous fashion such that the retailer need not maintain a separate substantial amount of Bitcoin funds for sake of ticket sales.

Depending on particular design and business objectives, the ticket 100 may include a host of additional features. For example, given that the ticket 100 is of no particular value until loaded there may be no great concern over tracking and monitoring ticket locations in advance of being loaded by an authorized retailer. Nevertheless, for sake of keeping tabs on inventory, marketing or to allow follow-on action in case of lost tickets 100, they may be provided with readily traceable serial numbers or have unique lot-type information embedded within each loading code 150. Additionally, due to the capabilities of the loading code 150, anti-counterfeit measures such as use of a hologram, micro-writing or other efforts may be used to help prevent copying of the code 150.

Referring now to FIG. 2A, a front perspective view of the ticket 100 of FIG. 1 is shown revealing the above referenced redeeming material layer 220. That is, the coded region 125 of the ticket 100 includes a redeeming material layer 220 with at least one redeeming code 250, 255, 257 located below the loading material layer 101 of FIG. 1. Thus, in the view of FIG. 2A, the redeeming layer 220 and codes 250, 255, 257 are visible and accessible due to sufficient removal of the loading material layer 101 and code 150 thereabove. That is, the ticket 100 may constitute a printable substrate 275 with varying layers thereover (or below). Depending on whether or not the loading material layer 101 with code 150 is present or not at the coded region 125, the appearance of the ticket surface 225 may change.

As indicated above, with the loading code 150 present, the ticket 100 may be "loaded" with cryptocurrency. However, upon removal of the loading code 150 of FIG. 1, the ticket 100 may no longer be loaded via the most practical means of the dedicated loading code 150. Indeed, in one embodiment, the loading 150 and redeeming 250 codes, perhaps along with an electronic application (e.g. see 401 of FIG. 4) may be tailored together to prohibit loading except via the in-tact, dedicated loading code 150. Regardless, even in absence of such extensive measures, from a user standpoint, for all intents and purposes, removing of the loading material layer 101 and code 150 substantially avoids further loading of the ticket 100 with cryptocurrency.

At the same time, however, this removing is nevertheless required in order to use or "redeem" the cryptocurrency from the ticket 100 via one of the underlying redeeming codes 250, 255, 257. Therefore, the removing of the loading material layer 101 and code 150 means that not only is subsequent reloading substantially stopped, but so to is subsequent redeeming. The ticket 100 is thus, a single-use, machine-like implement, in this embodiment for the management of cryptocurrency. Stated another way, completed use of the ticket 100 inherently leads to its own self-destruction and prevention from further use as a practical matter. As a result, the user is provided with a uniquely understandable management tool that may be of particular benefit for complex transactions such as those in the realm of cryptocurrency.

Continuing with reference to FIG. 2A, the redeeming codes 250, 255, 257 may be interchangeable and redundant from the user's perspective but they are also tied to one another regardless of which one is utilized. That is, when the user redeems one of the codes 250, 255, 257, for example through a mobile or other application as detailed further below, all of the codes 250, 255, 257 will be simultaneously redeemed. By way of specific example, when the depicted QR visual code 250 is used for redemption, the visual 250, alphanumeric 255 and auditory 257 codes will all be simultaneously disabled from further use.

As to the distinctions between the redemption codes 250, 255, 257, a variety of options are made available to the user. That is, unlike the loading code 150 of FIG. 1, which is likely to be managed and utilized for loading by a retailer or merchant, the redemption codes 250, 255, 257 may be utilized by a wider variety of user types. Thus, a visual code 250 may be provided for a person seeking redemption through a mobile phone application and wallet that interfaces with a QR code (see FIG. 5). Once more, as opposed to redemption through the user's personal mobile application, the visual code 250 may be sent to another user for redemption. Indeed, along these lines, even non-machine readable auditory 257 or alphanumeric 255 codes may also be phoned, e-mailed or texted to distant locations for redemption by an entirely different end user.

Providing the code 250, 255, 257 to another location for use may be of particular benefit where the end user (or the ticket purchaser) fails to have access to such technology but is nevertheless able to interface with a local merchant or retailer that does. So, for example, the party acquiring the ticket 100 may send the redemption code 250, 255, 257 to the end user or distant merchant in privy with the end user to allow the end user to redeem the code 250, 255, 257 for local currency from the distant merchant. In these types of circumstances, the ticket 100 has served as an intermediate cryptocurrency platform for users otherwise unable to participate in cryptocurrency transfers. Regardless, once this redemption takes place through any of the codes 250, 255, 257, the ticket 100 is no longer of any practical value.

Referring now to FIG. 2B, a side cross-sectional view of the ticket 100 of FIG. 1 is shown that simultaneously reveals the masking loading material layer 101 over the redeeming material layer 220 on a substrate 275. In the embodiment shown, the substrate 275 may be of conventional heavy bond paper, cardboard, polymer or other suitable material to support handheld use of the ticket 100 as a scratch-off implement. That is, as indicated above, the loading material layer 101 is "scratch-off" in nature. Thus, in addition to incorporating a loading code 150 and masking the underlying redeeming material layer 220 and redeeming codes 250, 255, 257 (see FIG. 2A), it is also tailored with removability in mind.

Removability of the scratch-off loading material layer 101 involves selecting a material and ensuring adhesion properties sufficient for remaining substantially in-tact during normal user handling and manipulation in absence of scratch-off efforts while also furthering scratching-off by the user when so desired. Available inks, the intended visual appearance of the loading code 150, material choices for the underlying redeeming layer 220 or substrate 275, likely processing conditions and a host of other factors may play a role in the material selected for the loading layer 101. Regardless, some tailored combination of conventional scratch-off inks and colored latex or other polymers may be utilized.

Figure 3A:
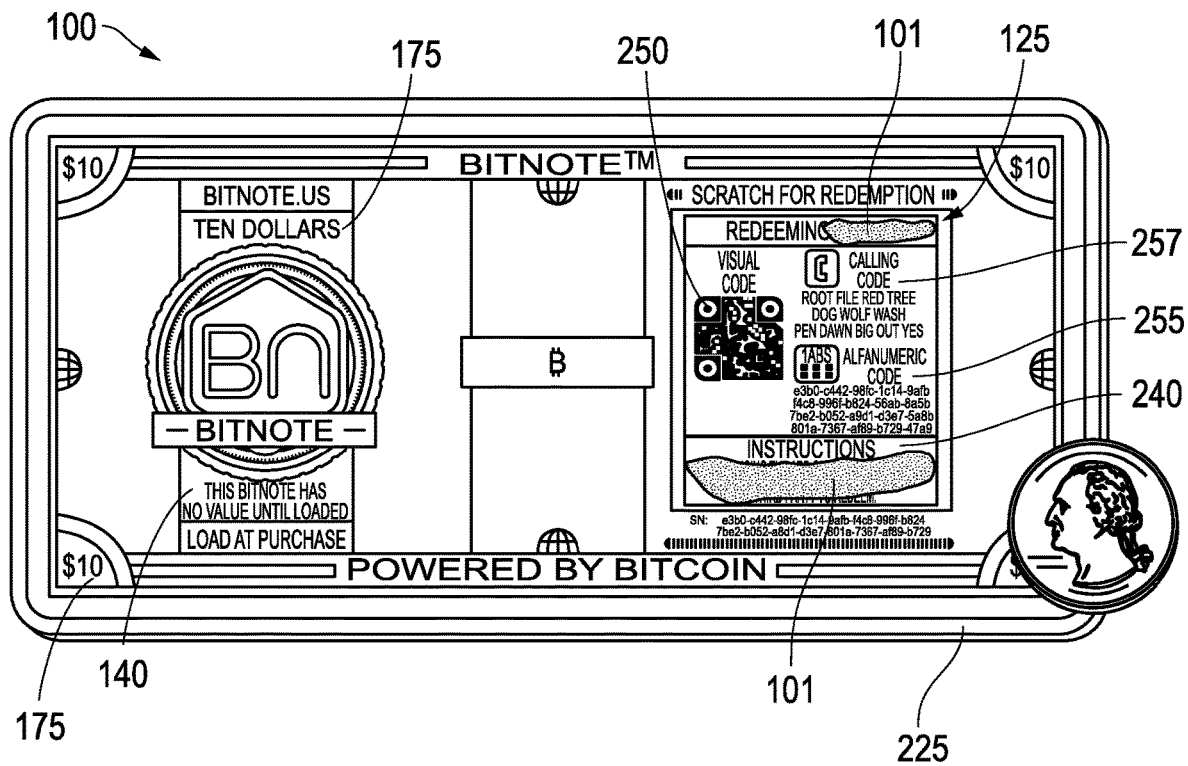
FIG. 3A is a front view of the ticket of FIGS. 1 and 2A revealing the underlying redeeming material layer with partial scratch-off remains of the loading material layer.

Continuing with reference to FIG. 2B, the redeeming material layer 220 is shown as multi-layered with a transparent layer 260 over an information layer 230. In this embodiment, the transparent layer may serve as a protective barrier to the physical scratch-off forces taken on by the ticket 100 during removal of the loading material layer 101 (for example, by a coin as shown in FIG. 3A). In this way, the removal of the masking loading material 101 may take place without substantial damage to redeeming code material 235. Given the see-through nature of the transparent layer 260, the redeeming codes 250, 255, 257, made up of the material 235, may thus be protected and also visibly revealed for sake of redemption as described above. Materials for the layers 260, 230 of the redeeming code layer 220 may be selected based on these and processing conditions. For example, the transparent layer 260 may be a solid clear ink whereas the redeeming code material 235 may be of an ink primarily tailored for permanency on the underlying substrate as opposed to being configured for scratching off.

The cross-section of FIG. 2B also reveals layers 280, 290 below the substrate 275. These may include a reactive layer 280 provided below the substrate 275 that is filled with microcapsules 285 of marking ink. Thus, similar to conventional carbonless papers, the microcapsules 285 may be configured to burst upon exposure to stressors from the opposite side of the substrate 275. Specifically, in this circumstance, scratch-off removal of the loading material layer 101 may translate into bursting of microcapsules within the reactive layer 280.

The reactive layer 280 may be sufficiently porous or of void space to allow for the visible presentation of the burst ink from the microcapsules 285. At the same time, however, a partially clear, opaque or transparent recording layer 290 below the reactive layer 290 may be provided so as to prevent the used, scratched-off ticket 100 from leaking ink onto the user or surrounding area while still being visible to the ticket user. Thus, concern over mess, ink or other chemical exposure to the user may be largely eliminated. In this regard, the recording layer 290 may also be absorbent to a degree that does not substantially impair the visibility of the noted marking of a scratched-off ticket 100. With brief added reference to FIG. 3B, upon scratch-off, marking 300 may be seen at the backside 325 of the ticket 100.

Figure 3B:
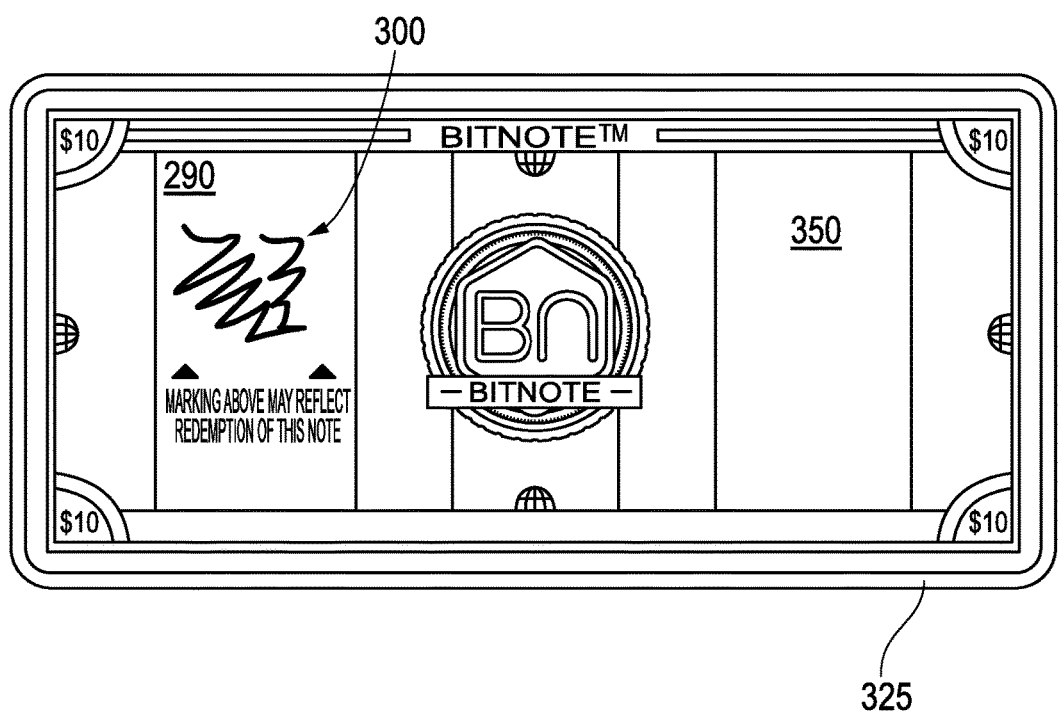
FIG. 3B is a back view of the ticket of FIG. 3A revealing indicator marks corresponding to a scratch-off of the loading material layer at the opposite side of the ticket.

Referring now to FIGS. 3A and 3B, front and back views of the ticket 100 as might be seen during user "scratch-off" as described above are shown. Specifically, FIG. 3A is a front view of the ticket 100 of FIGS. 1 and 2A revealing the underlying redeeming material layer's codes 250, 255, 257 with partial scratch-off remains 101 left in the coded region 125. FIG. 3B, on the other hand, depicts a backside 325 of the ticket 100 of FIG. 3A revealing indicator markings 300 corresponding to the scratching-off of the material 101 at the opposite side of the ticket 100 as described above. The end result is that a ticket 100 that has been scratched-off, and also most likely redeemed, will be highlighted with visible markings on both sides thereof.

Whether the front side of the ticket 100 is visible to a user with only residue 101 (FIG. 3A) or the backside 325 with markings 300 (FIG. 3B), the scratching-off will clearly be evidenced. In one embodiment, a particularly distinct matching color choice, for example, a vibrant red, may be employed for both the redeeming code material 235 and the ink for the markings 300 (see FIGS. 2B and 3B). Thus, from a user's perspective, the prominent display of what might be considered a "used" ticket 100 would be readily apparent with visible exposed red codes 250, 255, 257 at one side of the ticket 100 and red markings 300 at the other. In this sense, the ticket 100 provides an additional element of user-friendliness and an understanding aid to the user for what might otherwise appear to be complex cryptocurrency management. Recalling that, in circumstances where a retailer is responsible for loading the ticket 100, the conventional purchasing user might only hold "unused" tickets 100 in loaded form. In these scenarios, the user would not only immediately be able to decipher scratched-off used tickets 100 but also be aided in understanding that unmarked tickets 100 would most likely be loaded and unused. Of course, apart from just glancing at one side of the ticket 100 or the other, the user may take advantage of mobile application 401 to make such determinations certain (see FIG. 4).

Figure 4:
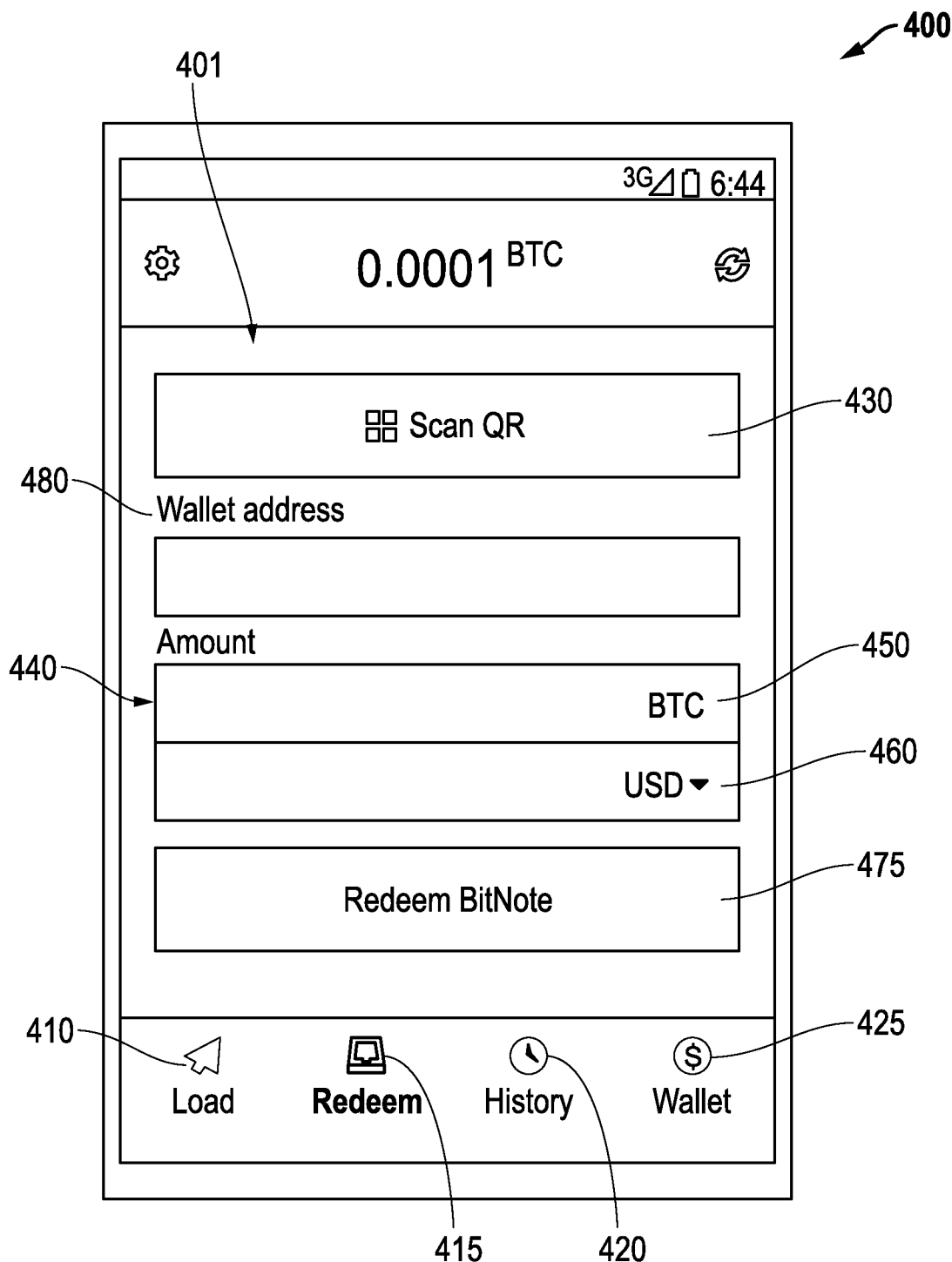
FIG. 4 is an embodiment of a mobile user interface screen displaying an application for use with a single-use cryptocurrency ticket.

Referring now to FIG. 4, an embodiment of a mobile device 400 is shown with a user interface screen displaying an application 401 for use with a single-use cryptocurrency ticket 100 as described hereinabove. The device 400 is equipped with a processor for functional use and interface with the ticket 100. For example, as alluded to above, with added reference to FIGS. 1 and 2A, the user may check the loaded amount of Bitcoin via a scan of the loading 150 or redeeming 250 codes, depending on which may be visible (see 430). Specifically, a particular amount of Bitcoin 450 and/or local currency 460 may be displayed at a real-time conversion region 440.

Figure 5:
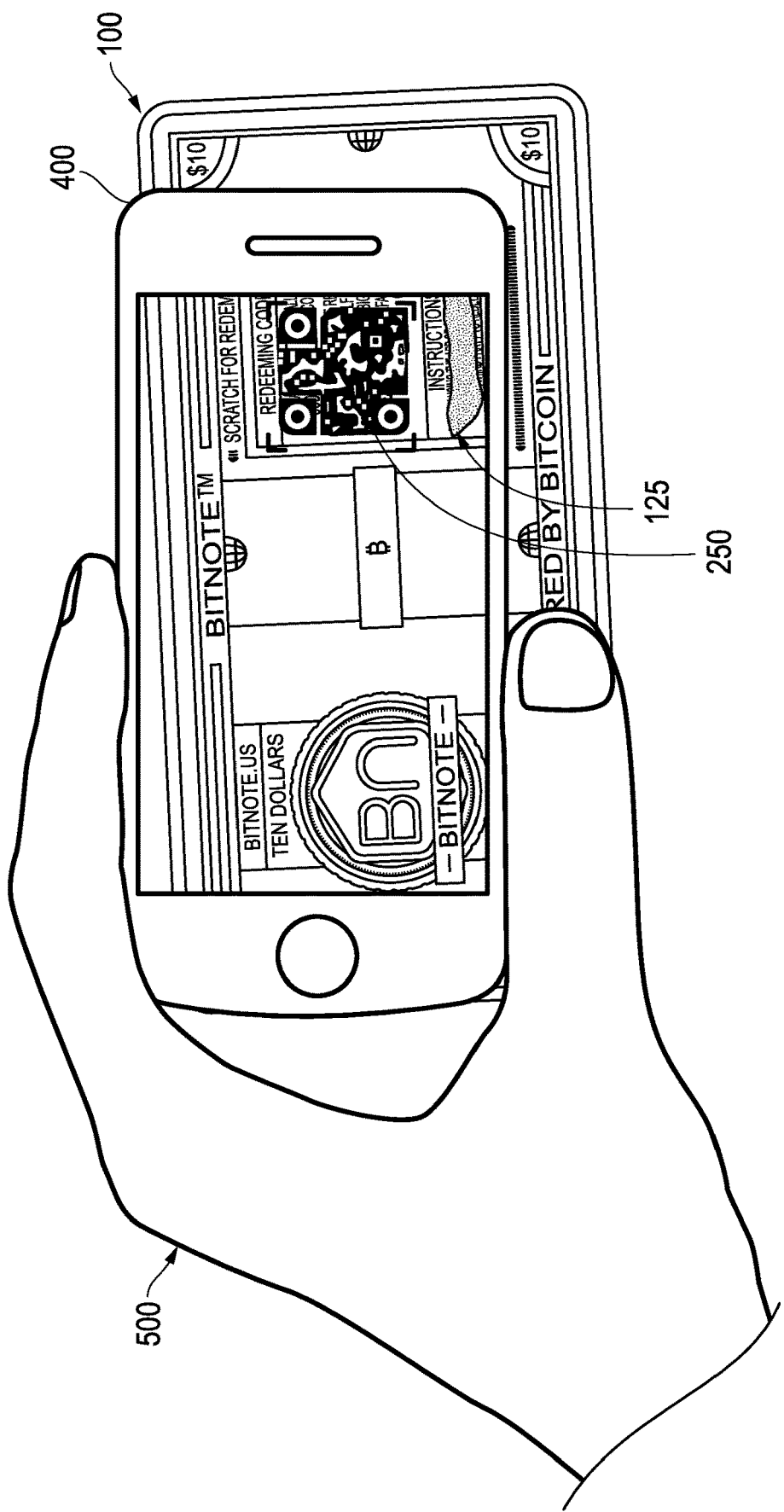
FIG. 5 is a depiction of another page of the application of FIG. 4 for redeeming cryptocurrency via interfacing with the redeeming material layer thereof.

With added reference to FIG. 1, apart from just running a preliminary check, the user may also redeem the ticket 100 by selecting the "redeem" category 415 of the application 401. With this category 415 selected and the loading material layer 150 scratched off, the user may press the scan button for reading the visible redeeming code 250 from the ticket 100 as shown in FIG. 5. Once read, the appropriate cryptocurrency information may be displayed at the region 440 as noted above. Further, the user may select the redeem button 475 to complete the redemption. In fact, the application 401 may further serve as an electronic wallet for continued management of the redeemed cryptocurrency. Along these lines, note the wallet 425, address 480 and history 420 functions that may be incorporated into the application 401 to allow for ongoing management of the cryptocurrency long after the ticket 100 is used and discarded as being of no practical further value.

In one embodiment, the application 401 may also be used by a merchant, perhaps for loading of a ticket 100 as described above (see 410). Alternatively, merchants may be provided with a merchant specific application for this purpose, for example, with features to aid in the near real-time acquisition and loading of Bitcoin so as to limit overhead expenses. By the same token, in one embodiment, non-merchant users may place orders for new tickets 100 that are un-loaded, similar to an order of blank bank checks. In this embodiment, the full functionality of the application 401 may be utilized by the user for both loading personally owned cryptocurrency as well as redeeming through the techniques discussed herein. Once more, whether for a merchant or self-loading user, the application 401 may be used to place "blank" unloaded ticket orders. Not only would this be safe in that the tickets 100 are unloaded during transit but it may also allow for the tickets 100 to be tracked as user specific, for example through the loading code 150, a serial number or other appropriate means if so desired. In yet another embodiment, where users order their own "blank" tickets 100 as indicated, even the redeeming codes 250, 255, 257 may be user-specific as an added security measure (e.g. to prevent redemption by any other party). Ultimately, information in one of the codes 250, 255, 257 (or 150) may be user-specific, merchant-specific or even monetary as indicated above for predetermining authorized users, merchants or even loading amounts.

Referring now to FIG. 5, a depiction of the page of the application 401 of FIG. 4 for redeeming cryptocurrency via the redeeming code 250 is shown. As indicated above, the full functionality of the application 401 with the ticket 100 may provide the user with a perspective similar to that of using his or her hand 500 to load conventional paper currency into a conventional wallet. That is, while paper money may be acquired and placed within a billfold, this is not an option in the world of cryptocurrency. Yet, as noted above, from the outset, each of the ticket 100 and the code 250 are of a single-use variety. This means that utilizing the ticket 100 by redeeming to an electronic wallet necessitates that the physical ticket 100 be figuratively placed entirely within the device 400 wallet during the redeeming. For embodiments herein, this occurs by simply scratching-off to fully redeem the ticket 100 of the cryptocurrency. What is left behind is a scratched-off, marked up ticket 100 on both sides that is no longer of any value. The user has placed the entirety of the money in the wallet regardless and in the process simultaneously clearly marked the remnants as of no value (a used ticket 100). All that is left is for the user to make proper, responsible disposal of the used ticket 100. Please recycle.

Figure 6A:
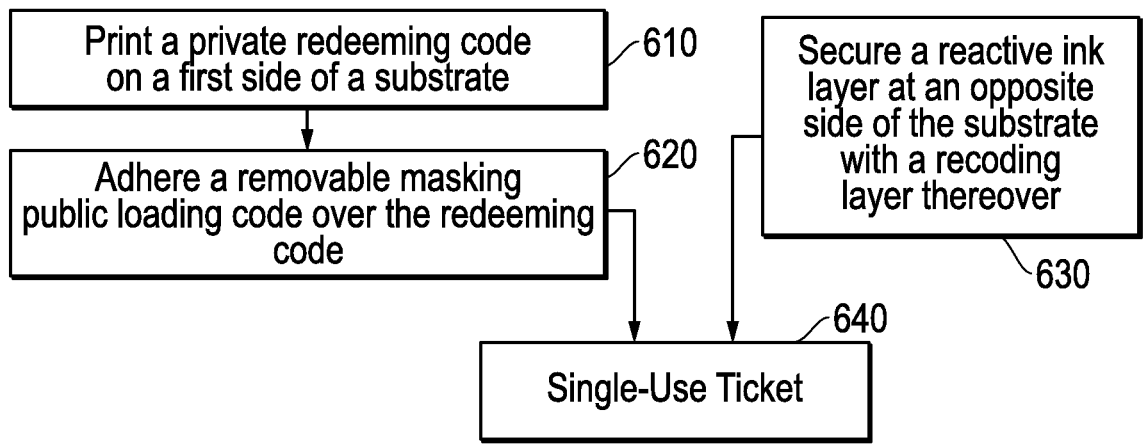
FIG. 6A is a flow-chart summarizing an embodiment of manufacturing the ticket of FIG. 1.

Referring now to FIG. 6A, a schematic flow-chart summarizing an embodiment of assembling the ticket of FIG. 1 is shown. Specifically, as described above, with a substrate available, a private redeeming code may be printed on one side thereof as indicated at 610. A removable mask that also serves as a one-time public loading code may then be adhered over the redeeming code as indicated at 620. Further, as noted at 630, at the other side of substrate, a reactive ink layer may be secured with a recording layer thereover. So, for example, scratch-off removing of the mask/loading code from the first side may be automatically marked at the second opposite side of the single-use ticket which has now been assembled (see 640).

Figure 6B:
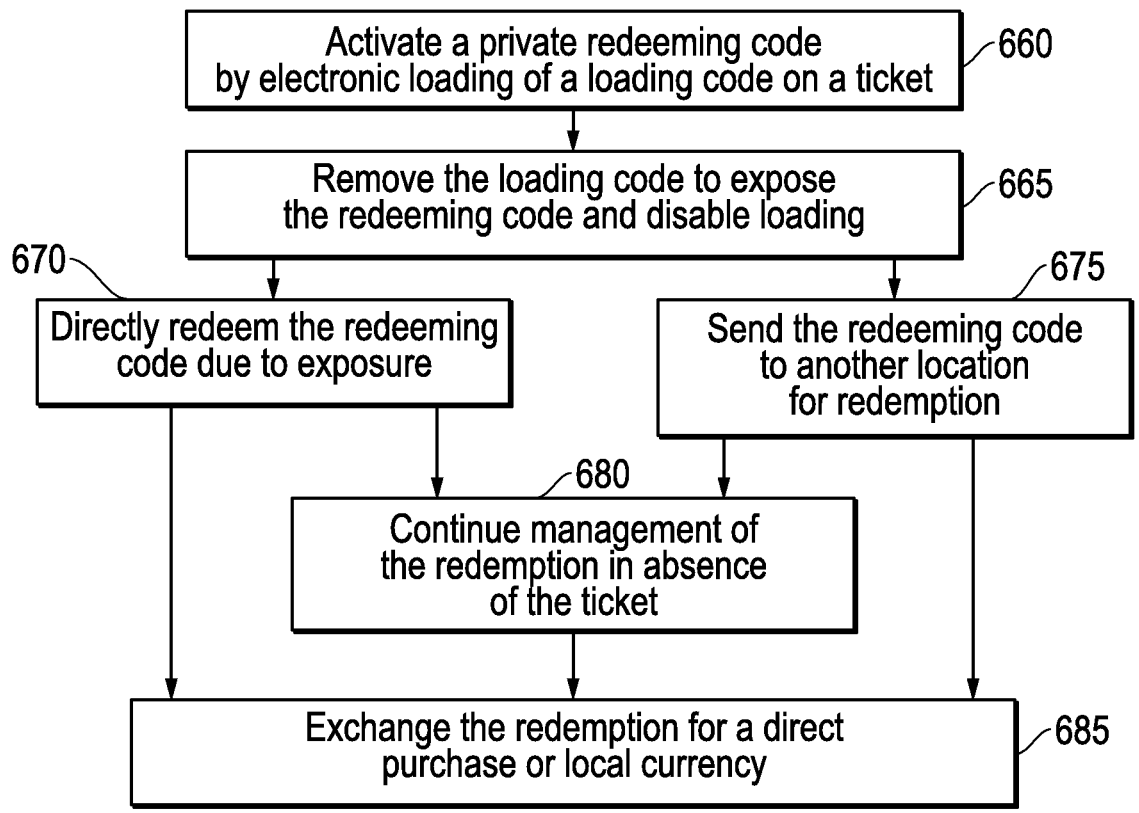
FIG. 6B is a flow-chart summarizing an embodiment of using the ticket of FIG. 1.

Referring now to FIG. 6B, a flow-chart is now shown summarizing an embodiment of how to use the assembled ticket of FIG. 6A. Specifically, the masked private redeeming code may be activated as indicated at 660 by loading of the noted loading code. Once this takes place, the loading code may be removed as indicated at 665. Thus, the underlying redeeming code may be exposed so that the ticket may be utilized while at the same time, further loading of the ticket via the loading code is disabled. Therefore, once redeemed as described below, there remains no practical value to the ticket.

When the user is ready to redeem the value from the ticket via the redeeming code, he or she may do so directly or by sending the code to another user at another location for redemption (see 670, 675). Auditory and alphanumeric versions of the redeeming code may be particularly beneficial for use when sending the code to a distant location for redemption. For example, a texted alphanumeric code may be readily obtainable by a distant end user perhaps more so than a visual QR code.

Even though the value may be redeemed from the ticket, for example as recorded at a ledger in the case of cryptocurrency, this redemption value may continue to be managed even in absence of the ticket (see 680). For example, a user may use a digital wallet application to manage the cryptocurrency going forward without continued use of the ticket which may now be discarded. Of course, as indicated at 685, rather than continuing to manage the cryptocurrency, it may be exchanged for purchases or conversion to a local currency, the latter perhaps being a likely scenario where the redeeming code has been sent to a distant location for redemption.

Embodiments described hereinabove provide a manner of simplifying the management, use and understanding of cryptocurrency via a tangible medium. Specifically, a cryptocurrency user may be provided with a more familiar cash-like handheld instrument for cryptocurrency management. Once more, this is achieved in a manner that overcomes the potential for user-confusion that may surround the fact that once the cryptocurrency is spent, the corresponding tangible instrument or "ticket" does not automatically depart from the user like conventional cash. Specifically, the spending of the cryptocurrency simultaneously physically converts ticket into a dramatically different instrument in appearance that may no longer be used to manage cryptocurrency.

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. For example, while the focus of embodiments herein surround use of ticket embodiments for management of cryptocurrency, these tickets and applications may be applied to other forms of information management. These may include titles, wills, or any number of transfer, accounting processes for which a simplified single-use form of tangible instrument may serve as a beneficial managing tool for aiding user understanding, particularly where traditional handheld tickets/documents are being replaced by electronic versions thereof. Regardless, the foregoing description should not be read as pertaining only to the precise structures described and shown in the accompanying drawings, but rather should be read as consistent with and as support for the following claims, which are to have their fullest and fairest scope.

We claim:

1. A system for single-use management of information, the system comprising:
- a handheld ticket for tangible manipulation by a first user, the handheld ticket comprising:
- a substrate;
- at least one non-machine readable redeeming code printed on the substrate for accessing the information; and
- a machine readable loading code covering the at least one non-machine readable redeeming code, wherein the machine readable loading code is for associating the information with the non-machine readable redeeming code,
- wherein access to the at least one non-machine readable redeeming code is prohibited by one of the machine readable loading code and another covering;
- a first electronic device comprising:
  - an interface screen;
  - a first non-transitory memory; and
  - a first processor coupled to the first non-transitory memory and configured to read instructions from the first non-transitory memory to cause the first processor to:
    - access the non-machine readable redeeming code for sending upon marking of the handheld ticket by removal of one of the loading code and the other covering;
    - send the non-machine readable redeeming code to a second electronic device; and
- the second electronic device of a second user, the second electronic device comprising:
  - a second non-transitory memory; and
  - a second processor coupled to the second non-transitory memory and configured to read instructions from the second non-transitory memory to cause the second processor to:
    - receive the non-machine readable redeeming code from the first electronic device for redemption; and
    - redeem the non-machine readable redeeming code.

2. The system of claim 1, wherein the information is information relative to one of cryptocurrency rights, title rights, probate rights, asset rights, and access rights.

3. A single-use cryptocurrency method comprising:
- printing at least one non-machine readable redeeming code on a given side of a substrate for cryptocurrency management by a user;
- adhering a public loading code layer with a machine-readable loading code over the at least one non-machine readable redeeming code to prohibit access thereto;
- electronically activating the non-machine readable redeeming code with a particular set amount of cryptocurrency to convert the substrate to a single-use cryptocurrency ticket;
- removing, by a first user, the loading code layer for marking the single-use cryptocurrency ticket and to sufficiently expose the at least one non-machine-readable code;
- selecting, by the first user, the exposed non-machine readable code;
- electronically sending, by the first user at a first location, the selected non-machine readable redeeming code to a second user at another location; and
- redeeming of the selected non-machine readable redeeming code by the second user after the marking of the single-use cryptocurrency ticket.

4. The method of claim 3, wherein the at least one non-machine readable redeeming code is one of a plurality of private redeeming codes.

5. The method of claim 4, wherein the plurality of redeeming codes comprise redeeming codes of different types including machine and non-machine readable codes.

6. The method of claim 3, wherein the selected redeeming code on the substrate is on a first surface of the substrate, the method further comprising:
- releasing marking ink within microcapsules in a reactive layer on a second surface of the substrate opposite the first surface of the substrate upon the removing; and
- protecting the first user from exposure to the marking ink upon the releasing with a recording layer on the reactive layer.

7. The method of claim 3, wherein the loading code layer presents the loading code at a transparent filter of the loading code layer.

8. The method of claim 7, wherein the presented loading code is supportably rendered by a code different from the selected redeeming code.

9. The method of claim 7, wherein the transparent filter is a colored filter window portion of the loading material layer.

* * * * *